United States Patent
Mai et al.

(10) Patent No.: US 10,629,931 B2
(45) Date of Patent: Apr. 21, 2020

(54) METHOD AND REGULATION APPARATUS FOR REGULATING A FUEL CELL OR A FUEL CELL STACK

(71) Applicant: Hexis AG, Winterthur (CH)

(72) Inventors: Andreas Mai, Constance (DE); Boris Iwanschitz, Winterthur (CH); Markus Linder, Winterthur (CH); Hanspeter Kuratli, Uster (CH)

(73) Assignee: Hexis AG, Winterthur (CH)

( * ) Notice: Subject to any disclaimer, the term of this patent is extended or adjusted under 35 U.S.C. 154(b) by 1946 days.

(21) Appl. No.: 13/871,790

(22) Filed: Apr. 26, 2013

(65) Prior Publication Data
US 2013/0288147 A1  Oct. 31, 2013

(30) Foreign Application Priority Data
Apr. 27, 2012  (EP) .................................... 12166039

(51) Int. Cl.
| | |
|---|---|
| *H01M 8/04537* | (2016.01) |
| *H01M 8/04828* | (2016.01) |
| *H01M 8/04858* | (2016.01) |
| *H01M 8/124* | (2016.01) |

(52) U.S. Cl.
CPC ... *H01M 8/04552* (2013.01); *H01M 8/04559* (2013.01); *H01M 8/04582* (2013.01); *H01M 8/04589* (2013.01); *H01M 8/04649* (2013.01); *H01M 8/04947* (2013.01); *H01M 8/04952* (2016.02); *H01M 2008/1293* (2013.01)

(58) Field of Classification Search
CPC ......... H01M 8/04552; H01M 8/04559; H01M 8/04582
USPC .......................................................... 429/431
See application file for complete search history.

(56) References Cited

U.S. PATENT DOCUMENTS

| | | | |
|---|---|---|---|
| 6,881,510 B1 * | 4/2005 | Gyoten ............ | H01M 8/04104 429/431 |
| 2010/0173212 A1 | 7/2010 | Senoue | |

FOREIGN PATENT DOCUMENTS

| | | |
|---|---|---|
| JP | 11195423 A | 7/1999 |
| JP | 2006085959 A | 3/2006 |

OTHER PUBLICATIONS

European Search Report dated Oct. 18, 2012 in European Application No. 12166039.3-2119.

* cited by examiner

*Primary Examiner* — Niki Bakhtiari
(74) *Attorney, Agent, or Firm* — Kilpatrick Townsend & Stockton LLP

(57) ABSTRACT

In a method for regulating a fuel cell stack (1), a current-voltage characteristic of the fuel cell stack is detected and evaluated to determine an operating point of the fuel cell stack, wherein a current-voltage characteristic of the fuel cell stack (1) is detected at time intervals in operation whose gradient has a minimum, a characteristic value ($R_{min}$) for the minimum of the gradient is respectively determined from the detected current-voltage characteristic and a desired value for the operating point is determined by addition of a predefined offset value ($R_{offset}$) to the characteristic value, and wherein the fuel cell stack (1) is regulated by the desired value determined in this manner.

12 Claims, 4 Drawing Sheets

METHOD AND REGULATION APPARATUS FOR REGULATING A FUEL CELL OR A FUEL CELL STACK

This application claims priority to European Application No. 12166039.3 filed on Apr. 27, 2012, the disclosure of which is incorporated by reference herein.

The invention relates to a method and to a regulation apparatus for regulating a fuel cell or a fuel cell stack in accordance with the preamble of claim 1 or the preamble of claim 9 as well as to a fuel cell, to a fuel cell stack and to a fuel cell system in accordance with the preamble of claim 12.

Fuel cells, in particular high-temperature fuel cells of the SOFC (solid oxide fuel cell) type, allow a utilization of energy of a fuel through an energy conversion. In this respect, both electric energy, which is generated on the basis of electrochemical processes, and thermal energy, which arises in the form of hot waste gases, can be utilized. Gaseous flows of two reactants are conducted separately through the cells. The first reactant, which is in particular environmental air, contains oxidizing components; the second reactant reducing components. A gas containing methane (e.g. natural gas) is advantageously used as the second reactant which is conducted through a reformer before the entry into the cells and is there converted into the reducing components of hydrogen and carbon monoxide by means, for example, of an additional infeed of water and optionally air and while supplying process heat. The hot waste gas can advantageously be used as the source for the process heat required in the reformer.

A method for operating a fuel cell battery is known, for example, from document EP 1 205 993 A1. In this method, a regulation of the fuel cell battery dependent on the power requirements is described.

Figure 1:
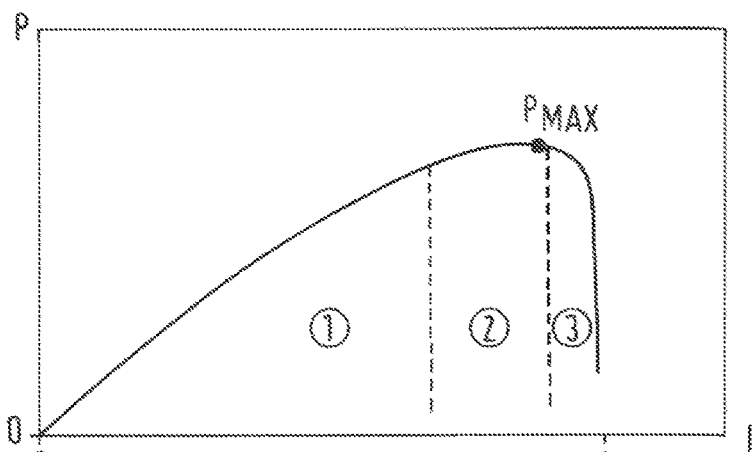

In practice, fuel cells and fuel cell stacks are usually operated in the vicinity of the maximum performance which can be achieved for a given fuel gas flow since the fuel gas utilization is best there. FIG. 1 shows a typical power-current curve of a fuel cell. At the current value I=1, 100% of the available fuel gas is consumed. Below the maximum power $P_{max}$, the fuel gas utilization and the powers drop (range ① in FIG. 12), whereas an operation above the maximum power results in increased to catastrophic aging due to electrochemical oxidation of the anode (range ③ in FIG. 1). For safety reasons, an operating point just below the maximum power is usually aimed for. This choice of the operating point corresponds to range ② on the power curve shown in FIG. 1.

In conventional processes for regulating a fuel cell stack, either the current or the output voltage is kept constant in the vicinity of the maximum power. In both methods, the fuel cell and the fuel cell stack are not always operated in the ideal range ② shown in FIG. 1. These two methods are, however, easy to realize from a technical regulation aspect and have proven themselves for measurements under the operating conditions present in laboratories.

In practice outside the laboratory, the operating conditions are more complex since a series of influencing factors which influence the operating point are known less exactly than in the laboratory:

Internal resistance or, in a fuel cell stack, layer resistance: This influences the ideal operating point, but is not known due to fluctuations in the manufacturing quality and above all, however, due to the increase in the internal resistance or layer resistance with the operating time (aging of the fuel cell).

Varying fuel composition (natural gas qualities). In the laboratory, fuel cells are usually operated with precisely defined fuel gases (e.g. hydrogen or methane) or the gas quality is monitored when natural gas is used. Outside the lab, the devices are operated using natural gas from the local natural gas grid. Since the natural gas comes from different sources, the composition can fluctuate locally and over time.

Gas flowmeters: Flowmeters used in fuel cell systems are inferior to laboratory instruments in measurement accuracy since usually less expensive flowmeters are used.

Leaks in the fuel cell stack: Some of the fuel gas is converted without it being available for electricity generation due to smaller leaks in the fuel cell stack. The exact value is not known in operation and can vary over time.

Independently of the selected operating mode, it must absolutely be avoided that the fuel cells are operated above the power maximum. This would result in damage to the cells or to increased degradation rates.

Different regulation and control strategies are used in dependence on the conditions of use. If the fuel cell can always be operated under constant conditions such as are present in the laboratory, for example (constant fuel gas quality, temperature, humidity, etc.), a regulation of the current is to be preferred. The current-voltage characteristics are shown by way of example in FIG. 2 without taking account of the fuel gas consumption for a new fuel cell with small internal resistance (characteristic $U_1(I)$) and for an aged cell with increased internal resistance (characteristic $U_2(I)$). The internal resistance of the fuel cell or the resistance of the duplicating unit of a fuel cell stack increases over time due to aging effects (degradation).

Figure 3:
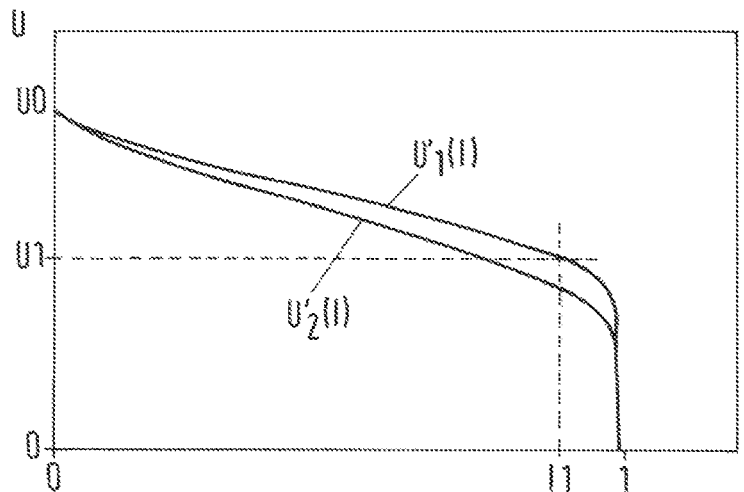

If the fuel gas consumption is additionally taken into account, current-voltage characteristics $U'_1(I)$, $U'_2(I)$ such as shown in FIG. 3 result. The degradation results in a lowered voltage with the same current (dashed line at I1). Despite the increase in internal resistance due to the degradation, the current density for the maximum electric efficiency remains almost constant. It is thereby ensured that the cell can be operated within the ideal operating range, as shown in FIG. 1.

Fuel cells are usually operated with natural gas in use outside the laboratory. Natural gases can vary greatly in their chemical composition, with both local and time fluctuations occurring. As a rule the minimal air requirement ($L_{min}$, natural gas characteristic) and also the gas amount introduced into the process change with the change in the fuel quality since the flow regulators have a dependency on the gas composition. The current at the point of the power optimum thus also changes.

Figure 4:
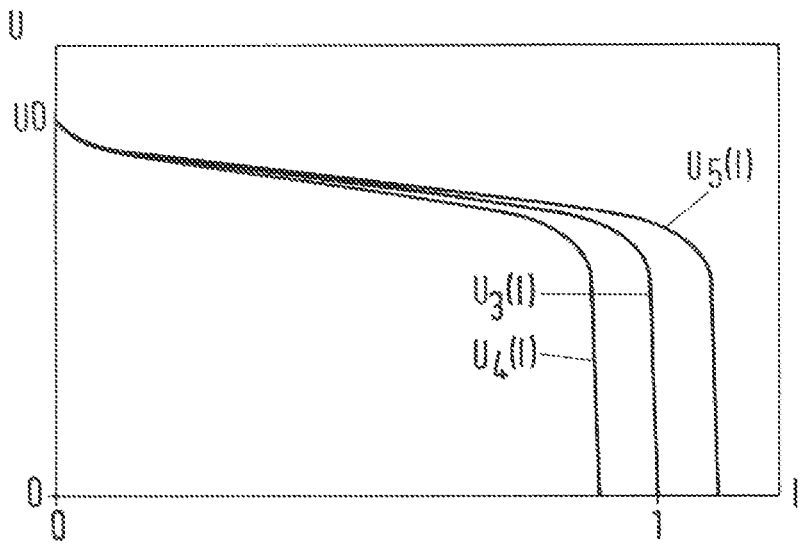

FIG. 4 shows three current-voltage characteristics $U_3(I)$, $U_4(I)$, $U_5(I)$ while taking account of the gas consumption, but without taking account of the internal resistance. Such characteristics can be calculated with the aid of thermodynamic calculations and with the aid of the Nernst equation. In characteristic $U_3(1)$, the fuel gas flow and fuel gas quality correspond exactly to the desired values; in characteristic $U_4(1)$, the fuel gas flow is smaller or the fuel gas quality is worse than the desired values; and in characteristic $U_5(1)$, the fuel gas flow is larger or the fuel gas quality is better than the desired values.

Figure 5:
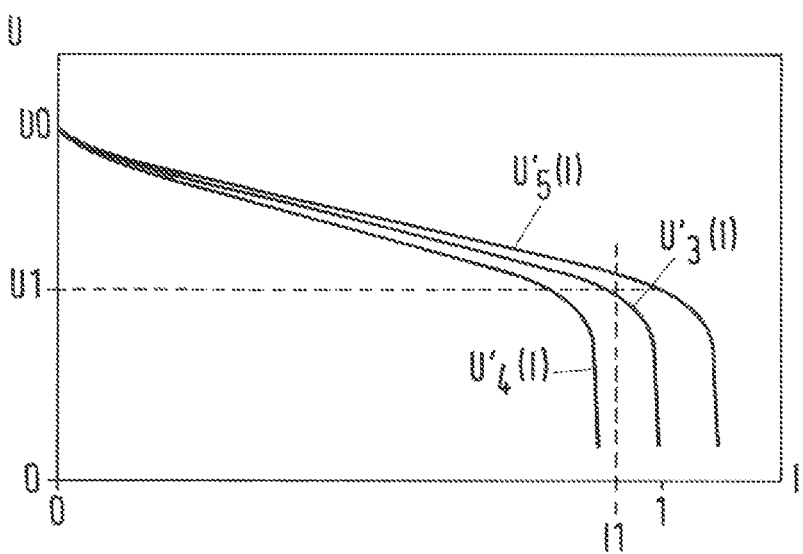

In FIG. 5, the corresponding characteristics $U'_3(1)$, $U'_4(I)$, $U_5(I)$ are shown while taking account of the internal resistance and the gas consumption. In this case, a regulation with a constant voltage (dashed line at U1) is to be preferred over a regulation at a constant current since it ensures that the cell voltage does not enter into the critical range of less than 0.6 V. Below a cell voltage of 0.6 V, there is the risk that the anode reoxidizes electrochemically since the oxidation potential of the nickel lies in this range, which results in damage to the cells.

The regulation at a constant output voltage has the disadvantage, however, that as a consequence of the aging of the fuel cells, the current and thus the fuel gas utilization fall and the power degradation is higher as the operating duration increases than with the regulation with a constant current (see dashed lines in FIG. 3).

The aging-induced degradation of the fuel cell stack and variations in the composition of the natural gas are unavoidable marginal conditions. Neither the regulation to a constant voltage nor the regulation to a constant current are thus the ideal solution for fuel cell systems which are operated using natural gases.

It is the object of the invention to provide a method and a regulation apparatus for regulating a fuel cell or a fuel cell stack with which the fuel cell or the fuel cell stack can be safely operated in the vicinity of the maximum power and simultaneously the power degradation as a consequence of aging of the fuel cells is smaller than on a regulation to constant voltage.

This object is satisfied in accordance with the invention by the method defined in claim 1 and by the regulation apparatus defined in claim 9 as well as by the fuel cell, the fuel cell stack and the fuel cell system which are defined in claim 12.

In the method in accordance with the invention for regulating a fuel cell or a fuel cell stack, a current-voltage characteristic of the fuel cell or of the fuel cell stack is detected and evaluated to determine an operating point of the fuel cell or of the fuel cell stack. The method is characterized in that a current-voltage characteristic of the fuel cell or of the fuel cell stack is detected at time intervals in operation whose gradient has a minimum; in that a value for the minimum of the gradient or a value $R_{min}$ related to the minimum of the gradient is respectively determined from the detected current-voltage characteristic; in that a desired value is determined for the operating point by a mathematical linking of the determined value with a predefined offset value $R_{offset}$, for example by addition of a predefined offset value to the determined value or by multiplication by a predefined offset value; and in that the fuel cell or the fuel cell stack is regulated using the desired value thus determined.

The fuel cell or the fuel cell stack are advantageously regulated via a regulable consumer or via a regulable current sink which are connected to the output of the fuel cell or of the fuel cell stack, with the regulable consumer being able to be a voltage converter or an inverter, for example, whose outputs can be connected to a power grid to feed the current generated in the fuel cell into the power grid.

The value for the minimum of the gradient can, for example, be the value of the internal resistance or of the area specific resistance (ASR) of the fuel cell or of the fuel cell stack in the minimum of the gradient or the value $R_{min}$ related to the minimum of the gradient can from case to case be linked to the value of the internal resistance or of the area specific resistance of the fuel cell or of the fuel cell stack in the minimum of the gradient. The area specific resistance is calculated from the internal resistance of a fuel cell in that the internal resistance is multiplied by the electrochemically active area of the fuel cell or in that the internal resistance of a duplicating unit of a fuel cell stack is multiplied by the electrochemically active area of a duplicating unit.

The value for the minimum of the gradient or the value $R_{min}$ related to the minimum of the gradient is advantageously mathematically determined from the current-voltage characteristic, for example numerically or by mathematical derivation of the current-voltage characteristic.

In advantageous embodiment variants, the fuel cell or the fuel cell stack is voltage controlled, i.e. regulated with a desired value $U_{soll}$ for the cell voltage or the output voltage, or it is current controlled, i.e. regulated with a desired value $I_{soll}$ for the current or the current density.

In an advantageous embodiment, first a sum value $R_{Summe}=R_{min}+R_{offset}$ is determined by addition of a predefined offset value $R_{offset}$ to the value $R_{min}$ for the minimum of the gradient or to the value $R_{min}$ related to the minimum of the gradient and a value corresponding to the sum value is determined with the aid of the current-voltage characteristic for the cell voltage or for the output voltage $U_{soll}$ or for the current or for the current density $I_{soll}$ which serves as a desired value for the regulation of the fuel cell or of the fuel cell stack.

In a further advantageous embodiment, a current-voltage characteristic of the fuel cell or of the fuel cell stack is detected in operation after at least 200 h or at least 500 h or at least 1000 h or every 200 h or 500 h or every 1000 h and the desired value is determined again from the respective detected current-voltage characteristic.

The regulation apparatus in accordance with the invention for a fuel cell, a fuel cell stack or a fuel cell system is configured to regulate the fuel cell or the fuel cell stack or the fuel cell system using one of the above-described methods or one of the associated embodiments and embodiment variants.

In an advantageous embodiment, the regulating apparatus is connected to an output of the fuel cell or of the fuel cell stack and contains a measuring and regulating unit which is configured to detect a current-voltage characteristic of the fuel cell or of the fuel cell stack and to determine a value for the minimum of the gradient or a value $R_{min}$ related to the minimum of the gradient from the detected current-voltage characteristic in order to determine a desired value for the operating point by a mathematical linking of the determined value with a predefined offset value $R_{offset}$, for example by addition of a predefined offset value to the determined value or by multiplication by a predefined offset value, and in order to regulate the fuel cell or the fuel cell stack or the fuel cell system using the desired value determined in this manner.

In a further advantageous embodiment, the regulating apparatus contains a regulable consumer or a regulable current sink which can be connected to the output of the fuel cell or of the fuel cell stack to regulate the fuel cell or the fuel cell stack via the regulable consumer or via the regulable current sink.

The invention furthermore includes a fuel cell or a fuel cell stack or a fuel cell system having a regulating apparatus or an embodiment of the regulating apparatus in accordance with the above description.

The method and the regulating apparatus for regulating a fuel cell or a fuel cell stack as well as the fuel cell and the fuel cell stack in accordance with the present invention have the advantage that the fuel cell or the fuel cell stack can be reliably operated even if the operating conditions vary over time since influence factors such as the age of the fuel cells, the fuel quantity, the fuel quality and any leaks are mapped in the gradient curve of the current-voltage characteristic. A further advantage is that the power degradation as a consequence of the aging of the fuel cells is lower than with a regulation using a constant voltage since, on a change of the internal resistance, the desired voltage for the regulation is adapted by the method and the regulation apparatus in accordance with the present invention.

The above description of embodiments and embodiment variants only serves as an example. Further advantageous embodiments can be seen from the dependent claims and from the drawing. Furthermore, individual features from the embodiments and embodiment variants described or shown can also be combined with one another within the framework of the present invention to form new embodiments.

Figure 2:
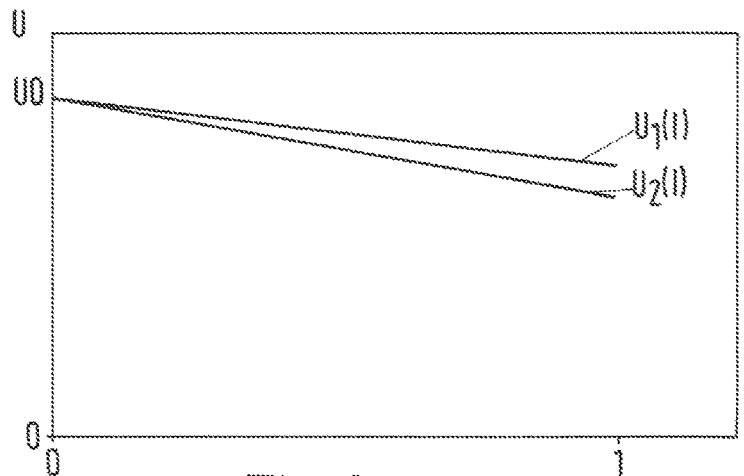
Figure 6:
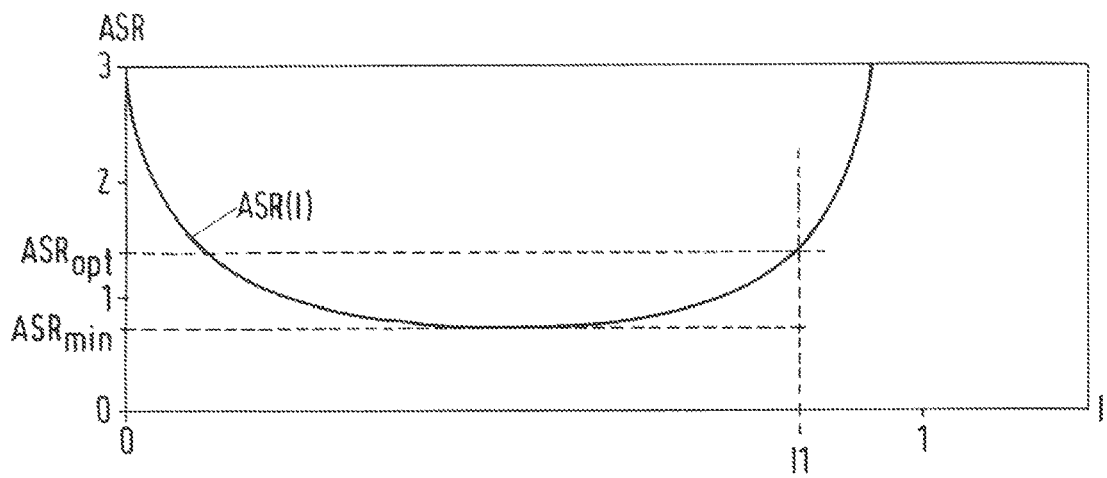
Figure 7:
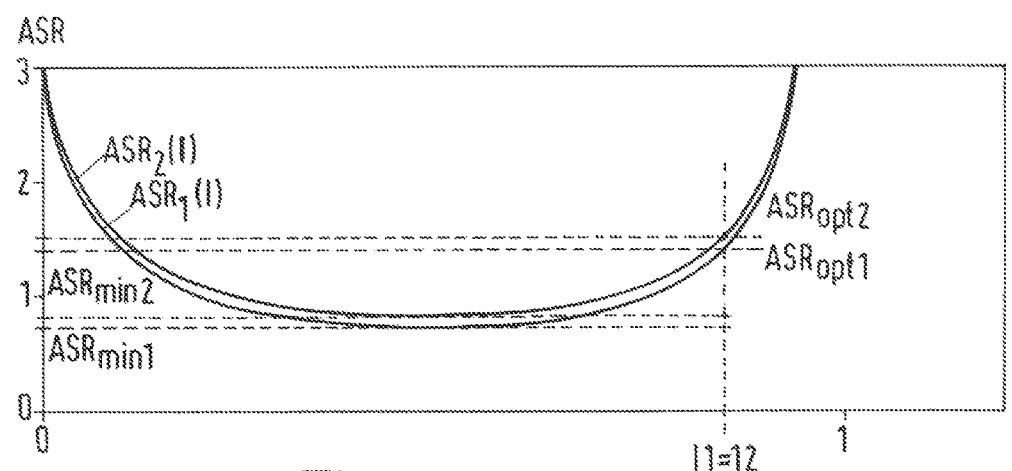
Figure 8:
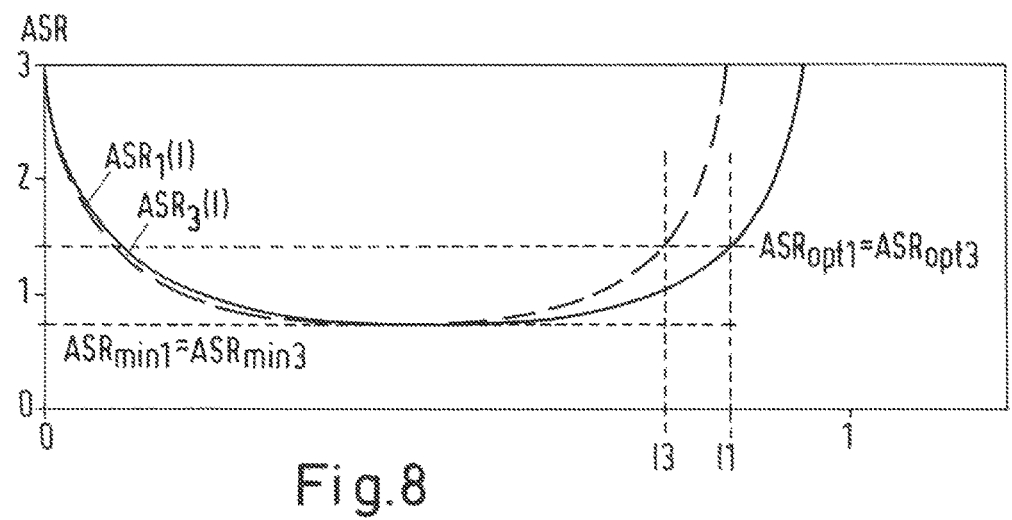
Figure 9:
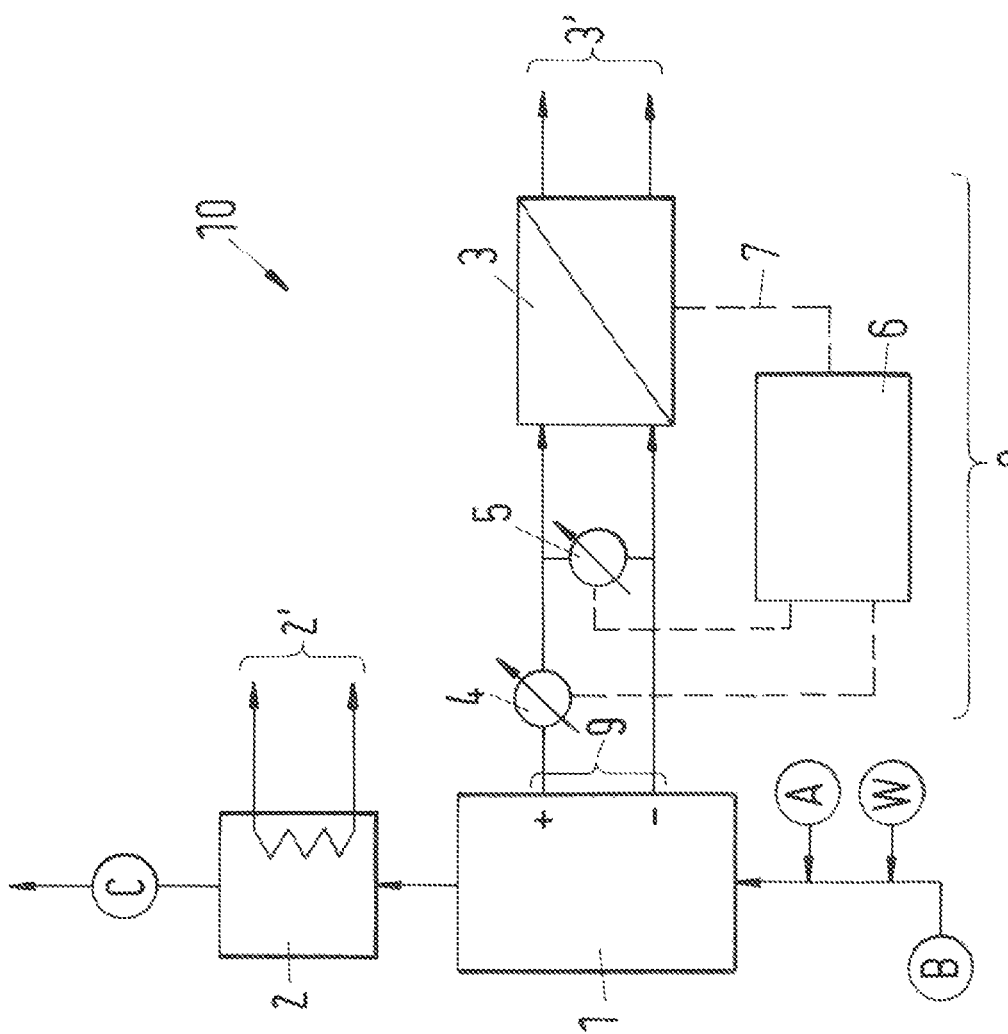

The invention will be explained in more detail in the following with reference to the embodiments and to the drawing. There are shown:

FIG. 1 a typical power-current curve of a fuel cell;

FIG. 2 two typical current-voltage characteristics of a fuel cell for two different internal resistances without taking account of the gas consumption;

FIG. 3 two typical current-voltage characteristics of a fuel cell for two different internal resistances while taking account of the gas consumption, FIG. 4 three typical current-voltage characteristics of a fuel cell for three different fuel gas flows or fuel gas qualities without taking account of the internal resistance;

FIG. 5 three typical current-voltage characteristics of a fuel cell for three different fuel gas flows or fuel gas qualities while taking account of the internal resistance;

FIG. 6 a typical curve of the area specific resistance (ASR) of a fuel cell;

FIG. 7 typical ASR curves of a new and of an aged fuel cell;

FIG. 8 typical ASR curves of a fuel cell with two different fuel gas flow rates or fuel gas qualities; and FIG. 9 a fuel cell stack having an embodiment of a regulating apparatus in accordance with the present invention.

FIG. 9 shows a fuel cell stack having an embodiment of a regulation apparatus 9 in accordance with the present invention. An arrangement of a fuel cell stack having a regulating apparatus is also called a fuel cell system in the following. The fuel cell stack 1 can, for example, be made up of high-temperature fuel cells of the SOFC (solid oxide fuel cell) type which are typically operated at a temperature of 600° C. to 1000° C. and allows the utilization of energy of a fuel by the energy conversion. In this respect, both electric energy, which is generated on the basis of electrochemical processes, and thermal energy, which arises in the form of hot waste gases, can be utilized. Gaseous flows of two reactants A, B are conducted separately through the cells. The first reactant A, which is in particular environmental air, contains oxidizing components; the second reactant B reducing components.

A gas containing methane (e.g. natural gas) is advantageously used as the second reactant B which is conducted through a reformer before the entry into the cells and is there converted into the reducing components of hydrogen and carbon monoxide by means, for example, of an additional infeed of water W and optionally air and while supplying process heat. The hot waste gas can advantageously be used as the source for the process heat required in the reformer.

The fuel cell stack 1 is as a rule connected to a heat exchanger 2 in which heat can be extracted from the hot waste gases of the fuel cell stack. The heat exchanger 2 is advantageously connected to a heating circuit 2'. The waste gases C can subsequently be led into the free air or the residual oxygen in the waste gases can be utilized in an additional burner which is not shown in FIG. 9.

In the embodiment shown, a regulating apparatus 8 is connected to an output 9 of the fuel cell stack 1. The regulating apparatus 8 contains a measuring and regulating unit 6 which is configured to detect a current-voltage characteristic of the fuel cell stack in time intervals whose gradient has a minimum, for example by means of a current sensor 4 and of a voltage sensor 5, and to determine a value for the minimum of the gradient or a value $R_{min}$ related to the minimum of the gradient from the detected current-voltage characteristic in order to determine a desired value for the operating point by a mathematical linking of the determined values with a predefined offset value $R_{offset}$, for example by addition of a predefined offset value to the determined value, and to regulate the fuel cell stack 1 using the desired value determined in this manner.

In an advantageous embodiment, the regulating apparatus 8 additionally contains a regulable consumer or a regulable current sink 3 which is connected to the output 9 of the fuel cell stack to regulate the fuel cell or the fuel cell stack via the regulable consumer or via the regulable current sink. For this purpose, the measuring and regulating unit 6 can be connected to the regulable consumer or to the regulable current sink via a line 7.

The regulable consumer 3 is advantageously a voltage converter or an inverter whose outputs can be connected to a power grid 3' to feed the current generated in the fuel cell stack into the power grid.

The invention furthermore includes a fuel cell or a fuel cell stack 1 or a fuel cell system having a regulating apparatus or an embodiment of the regulating apparatus in accordance with the above description.

An embodiment of a method in accordance with the present invention will be described with reference to FIGS. 6 to 9. In the method for regulating a fuel cell or a fuel cell stack 1, a current-voltage characteristic of the fuel cell or of the fuel cell stack is detected and evaluated to determine an operating point of the fuel cell or of the fuel cell stack. The method is characterized in that a current-voltage characteristic of the fuel cell or of the fuel cell stack is detected at time intervals in operation whose gradient has a minimum; in that a value for the minimum of the gradient or a value $R_{min}$ related to the minimum of the gradient is respectively determined from the detected current-voltage characteristic; in that a desired value is determined for the operating point by a mathematical linking of the determined value with a predefined offset value $R_{offset}$, for example by addition of a predefined offset value to the determined value; and in that the fuel cell or the fuel cell stack is regulated using the desired value thus determined.

The fuel cell or the fuel cell stack 1 are advantageously regulated via a regulable consumer or via a regulable current sink 3 which are connected to the output 9 of the fuel cell or of the fuel cell stack 1, with the regulable consumer 3, for example, being able to be a voltage converter or an inverter, for example, whose outputs 3' can be connected to a power grid to feed the current generated in the fuel cell or in the fuel cell stack into the power grid.

The value for the minimum of the gradient can, for example, be the value of the internal resistance or of the area specific resistance (ASR) of the fuel cell or of the fuel cell stack in the minimum of the gradient or the value $R_{min}$ related to the minimum of the gradient can from case to case be linked to the value of the internal resistance or of the area specific resistance of the fuel cell or of the fuel cell stack in the minimum of the gradient. The area specific resistance ASR is calculated from the internal resistance of a fuel cell in that the internal resistance is multiplied by the electrochemically active area of the fuel cell or in that the internal resistance of a duplicating unit of a fuel cell stack is multiplied by the electrochemically active area of a duplicating unit.

The value for the minimum of the gradient or the value $R_{mm}$ related to the minimum of the gradient is mathematically determined from the current-voltage characteristic, for example numerically or by mathematical derivation of the current-voltage characteristic.

In two advantageous embodiment variants, the fuel cell or the fuel cell stack 1 is voltage controlled, i.e. regulated with a desired value $U_{soll}$ for the cell voltage or the output voltage, or it is current controlled, i.e. regulated with a desired value $I_{soll}$ for the current or the current density.

In an advantageous embodiment, first a sum value $R_{Summe}=R_{min}+R_{offset}$ is determined by addition of a predefined offset value $R_{offset}$ to the value for the minimum of the gradient or to the value $R_{min}$ related to the minimum of the gradient and a value corresponding to the sum value is determined with the aid of the current-voltage characteristic for the cell voltage or for the output voltage $U_{soll}$ or for the current or for the current density $I_{soll}$ which serves as a desired value for the regulation of the fuel cell or of the fuel cell stack 1.

It is assumed by way of example in the following that the value $R_{min}$ for the minimum of the gradient of the current-voltage characteristic of the fuel cell or of the fuel cell stack corresponds to the value of the area specific resistance ASR in the minimum of the gradient.

FIG. 6 shows a typical curve ASR(I) of the area specific resistance ASR of a fuel cell in dependence on the current density I. The curve shown was obtained in that the output voltage of a fuel cell was detected in dependence on the current density I and subsequently the gradient, i.e. the area specific resistance ASR(I) was determined by mathematical derivation. The curve ASR(I) of the area specific resistance has, as shown in FIG. 6, a minimum $ASR_{min}$ characteristic for fuel cells.

Corresponding to the embodiment of the method described in the preceding paragraph, first a sum value $R_{Summe}=ASR_{min}+ASR_{offset}$ is determined, called $ARS_{opt}$ in FIG. 6, by addition of a predefined offset value $ASR_{offset}$ to the value $ASR_{min}$ for the minimum of the gradient and a value corresponding to the sum value $ASR_{opt}$ is determined for the output voltage $U_{soll}$ or for the current density $I_{soll}$ with the aid of the current-voltage characteristic, said value serving as a desired value for the regulation of the fuel cell or of the fuel cell stack 1. The value I1 for the current density corresponding to the sum value $ASR_{opt}$ can be seen directly from the curve of ASR(I) in FIG. 6.

The value of $ASR_{min}$ varies in dependence on the fuel cells used, on the degradation, on the fuel quantity, on the fuel quality and on any leaks. The value of $ASR_{min}$ typically lies in the range between 0.3 $\Omega cm^2$ and 1.0 $\Omega cm^2$. The offset value $ASR_{offsset}$ is characteristic for the respective fuel cell concept and can be determined by experiments. The offset value $ASR_{offset}$ typically lies between 0.3 $\Omega cm^2$ and 1.0 $\Omega cm^2$, preferably between 0.5 $\Omega cm^2$ and 0.8 $\Omega cm^2$.

In practice, the total curve of ASR(I) does not need to be detected. It is rather sufficient first to determine the value $ASR_{min}$ for the minimum of the gradient from the current-voltage characteristic. The sum value $ASR_{opt}=ASR_{min}+ASR_{offset}$ is determined from the respective determined value $ASR_{min}$ and the offset value $ASR_{offset}$ characteristic for the respective fuel cell technology. The current-voltage characteristic is now detected and evaluated until the gradient reaches the value $ASR_{opt}$. At this point, the corresponding value of the current density $I_{soll}$ is determined which corresponds to the value of the current density I1 in FIG. 6 and/or the corresponding value of the voltage $U_{soll}$ is determined.

The fuel cell stack is advantageously subsequently regulated and/or operated with voltage control with $U=U_{opt}$.

In a further advantageous embodiment, a current-voltage characteristic of the fuel cell or of the fuel cell stack is detected in operation after at least 200 h or at least 500 h or at least 1000 h or every 200 h or 500 h or every 1000 h and the desired value is determined again from the detected current-voltage characteristic.

The behavior with an aged fuel cell is explained with reference to FIG. 7. In FIG. 7, the ASR curve of the fuel cell of FIG. 6 (curve $ASR_1(I)$) is shown and by way of example that of an aged fuel cell (curve $ASR_2(I)$). It can be recognized that despite differences in the sum values $ASR_{opt1}$ and $ASR_{opt2}$ determined from the respective ASR curves, an almost equally high value for the desired value of the current density results (I1≈I2). Despite the aging of the cell, the stack can be operated close to the maximum power, i.e. close to the optimum.

The behavior with a changed fuel gas quality or with a changed fuel gas flow will be explained with reference to FIG. 8. In FIG. 8 the ASR curve of the fuel cell of FIG. 6 (curve $ASR_1(I)$) and by way of example that of a fuel fell which is operated at a 10% lower fuel gas flow is shown (curve $ASR_3(I)$). It can be recognized that the sum values $ASR_{opt1}$ or $ASR_{opt2}$ determined from the respective ASR curves are of almost the same magnitude. However, clearly different desired values for the current density (I1≈I3) result from the different course of the curves $ASR_1(I)$ and $ASR_3(I)$.

An additional benefit of the above-described method and of the above-described regulation apparatus for regulating a fuel cell or a fuel cell stack results when gas flow sensors are used with which the fuel gas flow and the minimal air requirement ($L_{min}$) of the gas used can be determined sufficiently precisely. In this case, the current density can be calculated at the ideal operating point through Faraday's Law. The described method can then be used for monitoring or also for calibrating the sensor during operation. Calibrated sensors are currently not available at prices which allow a use in small fuel cell devices to appear sensible.

The method and the regulating apparatus for regulating a fuel cell or a fuel cell stack as well as the fuel cell and the fuel cell stack in accordance with the present invention have the advantage that the fuel cell or the fuel cell stack can be reliably operated even if the operating conditions vary over time since influence factors such as the age of the fuel cells, the fuel quantity, the fuel quality and any leaks are mapped in the gradient curve of the current-voltage characteristic and are thus taken into account in the regulation of the fuel cell or of the fuel cell stack. This allows a safe operation of the fuel cell or of the fuel cell stack close to the maximum power, i.e. close to the optimum.

What is claimed is:

1. A method for regulating a fuel cell or a fuel cell stack comprising:
   detecting a current-voltage characteristic of the fuel cell or of the fuel cell stack at time intervals during operation of the fuel cell or of the fuel cell stack, wherein the detected current-voltage characteristic has a gradient with a minimum;
   determining an operating point of the fuel cell or of the fuel cell stack by determining a first value corresponding to a value for the minimum of the gradient or a resistance value related to the minimum of the gradient, from the detected current-voltage characteristic, and adding a predefined offset value to the first value; and regulating the fuel cell or the fuel cell stack using the determined operation point.

2. A method in accordance with claim 1, wherein the fuel cell or the fuel cell stack are regulated via a regulable consumer or a regulable current sink which are connected to the output of the fuel cell or of the fuel cell stack.

3. A method in accordance with claim 1, wherein the regulable consumer is a voltage converter or an inverter whose outputs are connectable to a power grid.

4. A method in accordance with claim 1, wherein the value for the minimum of the gradient is the value of the internal resistance or of the area specific resistance of the fuel cell or of the fuel cell stack in the minimum of the gradient or wherein the resistance value related to the minimum of the gradient is linked with the value of the internal resistance or of the area specific resistance of the fuel cell or of the fuel cell stack in the minimum of the gradient.

5. A method in accordance with claim 1, wherein the value for the minimum of the gradient or the resistance value related to the minimum of the gradient is mathematically determined from the current-voltage characteristic-numerically or by mathematical derivation from the current-voltage characteristic.

6. A method in accordance with claim 1, wherein the fuel cell or the fuel cell stack is voltage controlled by regulating cell voltage or output voltage, or wherein the fuel cell or the fuel cell stack is current controlled by regulating current or current density.

7. A method in accordance with claim 1, wherein first a sum value is determined by addition of the predefined offset value to the first value and wherein a value corresponding to the sum value is determined with the aid of the current-voltage characteristic for cell voltage or for output voltage or for current or for current density which serves as a desired value for regulation of the fuel cell or of the fuel cell stack.

8. A method in accordance with claim 1, wherein the current-voltage characteristic of the fuel cell or of the fuel cell stack is detected in operation a second time after at least 200 h or at least 500 h or at least 1000 h or every 200 h or every 500 h or every 1000 h and the operating point is determined again from the current-voltage characteristic detected the second time.

9. A regulating apparatus for a fuel cell, a fuel cell stack or a fuel cell system, configured to regulate the fuel cell or the fuel cell stack or the fuel cell system by means of a method in accordance with claim 1.

10. A regulating apparatus in accordance with claim 9, wherein the regulating apparatus is connected to an output of the fuel cell or of the fuel cell stack, and contains a measuring and regulating unit which are configured to detect the current-voltage characteristic of the fuel cell or of the fuel cell stack and to determine the value for the minimum of the gradient or the resistance value related to the minimum of the gradient from the detected current-voltage characteristic in order to determine the operating point.

11. A regulating apparatus in accordance with claim 9, additionally containing a regulable consumer or a regulable current sink which can be connected to the output of the fuel cell or of the fuel cell stack to regulate the fuel cell or the fuel cell stack via the regulable consumer or the regulable current sink.

12. A fuel cell or fuel cell stack or fuel cell system having a regulating apparatus in accordance with claim 9.

* * * * *